Nov. 3, 1931.         R. L. BROWN         1,829,978
TRACTION STEERING CLUTCH AND BRAKE ARRANGEMENT
Filed Feb. 20, 1928
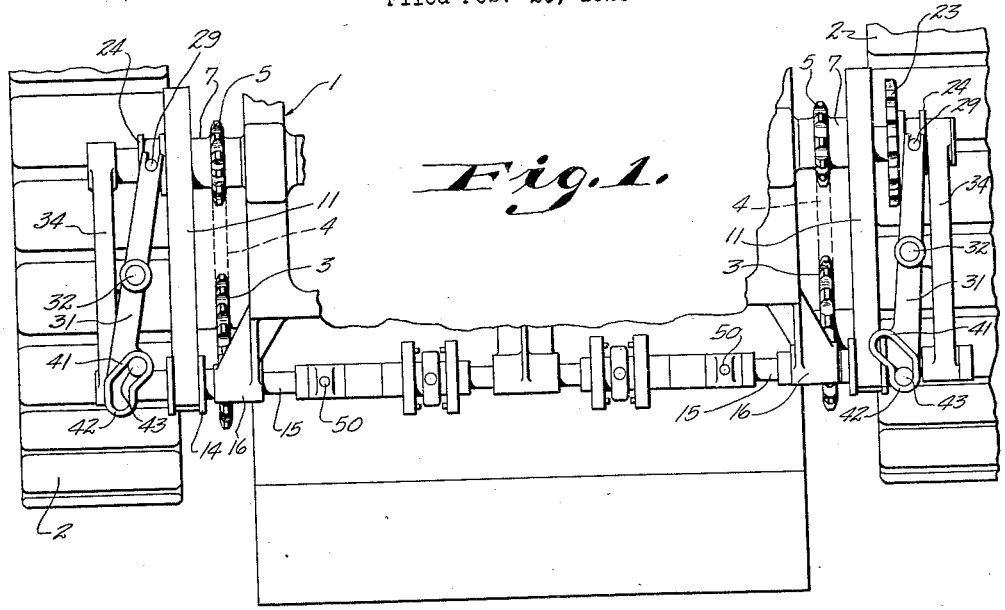
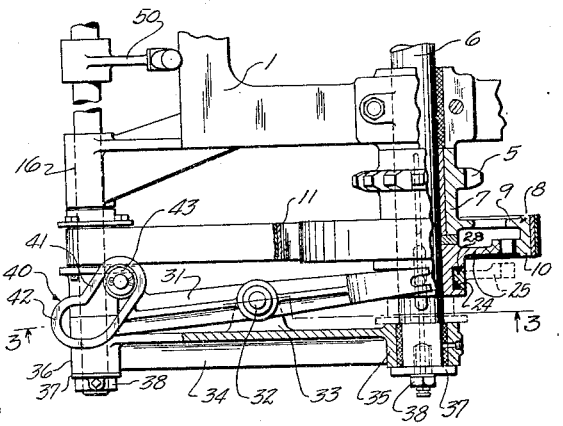
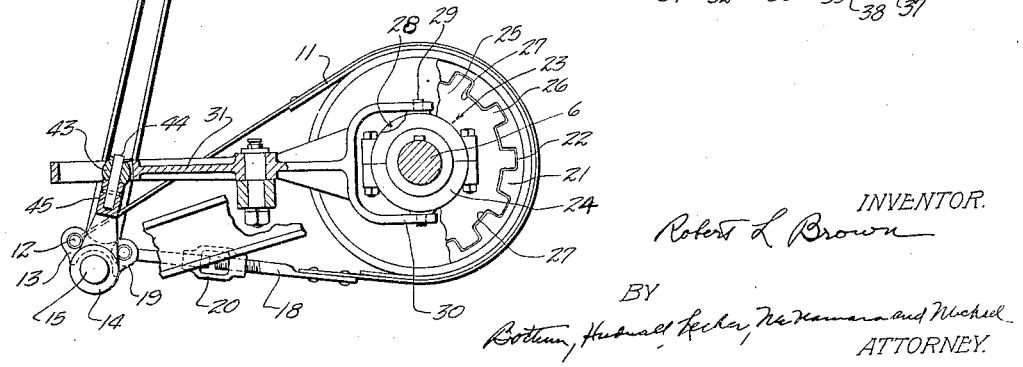
INVENTOR.
Robert L. Brown
BY
ATTORNEY.

Patented Nov. 3, 1931

1,829,978

UNITED STATES PATENT OFFICE

ROBERT L. BROWN, OF MILWAUKEE, WISCONSIN, ASSIGNOR TO HARNISCHFEGER CORPORATION, OF MILWAUKEE, WISCONSIN, A CORPORATION OF WISCONSIN

TRACTION STEERING CLUTCH AND BRAKE ARRANGEMENT

Application filed February 20, 1928. Serial No. 255,521.

This invention relates to a clutch and brake assembly and control means therefor especially designed and adapted for controlling for steering purposes traction means of the self-laying track or endless traction belt type employed on excavating machinery, or the like.

One of the principal objects of the present invention is to provide a device of this character having a clutch and brake assembly or unit associated with each traction belt and wherein a single lever operatively associated with each clutch and brake assembly may be conveniently operated to apply each brake positively and automatically whenever the associated clutch is disengaged and to release such brake automatically whenever the clutch is engaged.

Another important object of the invention resides in the provision of a device having these advantages and capacities and which permits of a varied application of the brake to permit the brake to exert a retarding or locking function and to take up wear as it occurs.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary plan view showing a portion of an excavating machine equipped with clutch and brake assemblies and controls embodying the present invention;

Figure 2 is a fragmentary view partly in plan and partly in horizontal section showing one of the units of the clutch and brake mechanism and its control; and Figure 3 is a view partly in vertical section and partly in elevation, the plan of the section being on line 3—3 of Figure 2.

Referring to the drawings, the numeral 1 designates generally a portion of an excavating machine which may be a back-filler or any other type of machine. The main frame 1 is supported in any conventional or appropriate manner on endless traction belts or self-laying tracks 2 actuated by conventional or appropriate means from driven sprocket wheels 3. The sprocket wheels 3 are driven by sprocket chains 4 from driving sprocket wheels 5 loosely mounted on the sections 6 of the conventional driving shaft which is driven from the power plant (not shown) in the usual manner. The sprocket wheels 5 are thus positively geared to the traction belts 2 and the present invention organizes with each of these sprocket wheels 5 a clutch and brake assembly and a lever control for each clutch and brake assembly. Of course, there are two such clutch and brake assemblies and controls, one at each side of the machine, but as they are of identical construction a single description will apply to both.

The hub of each sprocket wheel 5 is provided with an integral extension 7 with which a combined clutch member and brake drum, designated generally at 8, is integrally formed. This member 8 includes a web or body portion 9 integral with the extension 7, and a peripheral flange 10 integral with the web 9. The outer surface of this flange 10 constitutes a brake drum and is engaged by a brake band 11 one end of which is pivotally connected as at 12 to a lug 13 formed on a control or tensioning collar 14 fixed to a control shaft 15 rotatably supported in bearings 16 provided on the frame 1. The opposite end of the brake band 11 is connected by a rod 18 to a second lug 19 spaced from the lug 13 but also integral with the collar 14. The rod 18 is provided with a turn buckle 20 so that its length may be adjusted. The collar 14 and its lugs 13 and 19 constitute an operator for the brake.

For the purpose of clutching each driving sprocket 5 to its drive shaft section 6, the flange 10 is provided with a circumferential series of internal alternate projections and recesses designated at 21 and 22, respectively, and constituting a jaw clutch member. A cooperating clutch member 23 is splined on the shaft 6 and has a grooved hub 24 and an integral plate-like body 25 which projects radially from the hub and has its outer periphery formed with alternate projections and recesses 26 and 27 designed to mesh or interfit with the projections and recesses 21 and 22 of the driven clutch member.

A shifter collar 28 is loosely mounted in the grooved hub of the driving clutch member and has the usual trunnions 29 engaged with bearings provided in the forked end 30 of a shifter lever 31. The shifter lever 31 has its intermediate portion fulcrumed as at 32 on a lug 33 integral with a supporting bar 34 having its ends provided with bearings 35 and 36 which loosely fit about the end of the associated shaft section 6 and the end of the associated shaft 15, washers 37 and nuts 38 being employed to prevent displacement of the bearings 35 and 36 off of the ends of the shafts.

The rearward end of each shifter lever 31 is provided with a cam-way 40 having an inclined portion 41 and a straight portion 42, the inclined portion extending obliquely with respect to the axis of the shifting lever while the straight portion extends along a line approximately co-incident with the axis of the lever 31. A roller 43 is operatively fitted in the cam-way 40, this roller 43 being mounted for free rotation on a stud 44 fixed to an arm 45 integral with an extension of the collar 14 and hence also secured to the control shaft 15. Each shaft 15 is independently oscillated or partially rotated under the control of a hand lever 50.

With this contruction either traction belt may be positively driven while the other is disconnected from the driving means and the disconnected belt either retarded in its motion or else absolutely locked against movement. This permits the steering movement of the machine to be controlled and to be carried out, when desired, on a very short radius.

In effecting this operation one of the clutches is left engaged, and of course, at such time its brake is disengaged. The other clutch is disengaged and its associated brake applied simply by exerting a rearward pull on this hand lever 50. Such pull on either hand lever 50 swings the associated roller 43 rearwardly and this roller 43 coacts with the inclined portion 41 of the cam-way 40 in which it operates to swing the shifter lever 31 in a clockwise direction as viewed in Figure 2, thereby shifting the clutch member 25 to the dotted line position shown in Figure 2 and disengaging it entirely from the driven clutch member. This disengagement of the clutch members is thus effected by the coaction of the roller 43 with the inclined or angular part of the cam-way. During this motion of the roller 43 the brake is being tightened about the drum 10, as the lugs 13 and 19 are both swinging in a counter-clockwise direction, as viewed in Figure 3, thereby pulling the band taut about the drum. In order to provide for the application of variable tension to the brake band the cam-way 40 has the straight portion 42 which permits the brake to be further tightened after the clutch has been entirely disengaged. This straight portion 42 may be of any desired length and it makes it convenient for the operator to apply any degree of braking pressure. In other words, the tendency of the disconnected belt to slip may be retarded or the disconnected belt may be locked against movement. The straight portion 42 of the slot also provides for the take-up of wear. A reverse actuation of either lever 50, that is, a forward movement thereof, first swings the collar 14 to release the brake and then causes the associated roller 43 to coact with its cam-way 40 to swing the lever 31 in a counter-clockwise direction, as viewed in Figure 2, thereby engaging the projections and recesses 21, 22, 26 and 27 of the clutch members.

In this way the hand levers 50 may be easily controlled to engage both clutches and release both brakes, disengage both clutches and set both brakes, and disengage either clutch and apply its associated brake.

When either clutch is disengaged its brake is positively and automatically set. And the throw of the clutch does not limit the setting of the brake as the cam-way of each shifter lever has an angular path long enough to disengage the clutch and this angular path terminates in a straight path permitting positive setting of the brake after the clutch has been disengaged.

The invention claimed is:

1. A clutch and brake control comprising a shifter for the clutch, an operator of the brake, a control shaft providing a mounting for and directly connected to the brake operator, cooperating means on the control shaft and shifter for operating the shifter from the control shaft, said cooperating means providing for the application of various degrees of pressure on the brake independent of movement of the shifter after the clutch is disengaged, and means for operating the control shaft.

2. A clutch and brake control comprising a shifter for the clutch, an operator of the brake, a control shaft providing a mounting for and directly connected to the brake operator, said shifter having a cam-way, a member actuated by the control shaft and coacting with the cam-way for operating the shifter, said cam-way having a portion providing for continued application of the brake after the clutch has been disengaged, and means for operating the control shaft.

3. A clutch and brake control comprising a shifter lever for the clutch, an operator for the brake, a control shaft connected to the brake operator, said shifter lever having a cam-way provided with an inclined portion and a straight portion, a roller carried by the control shaft and coacting with the inclined portion of the cam-way to actuate the shifter lever and operating in the straight portion of the cam-way to permit of continued operation of the brake from the control shaft after the clutch is released, and means for turning the control shaft.

4. In steering mechanism for traction means of the endless traction belt type comprising a driving element geared to a traction belt and a driving shaft on which said driving element is loosely fitted, a drive clutch member and brake drum for rotating said driving element, a brake cooperable with the brake drum, a driving clutch member splined to the driving shaft and cooperable with the driven clutch member, a shifter for the driving clutch member, an operator for the brake, a control shaft on which the operator is mounted, and cooperating means on the control shaft and shifter for actuating the shifter from the control shaft, said cooperating means permitting the control shaft to continue the setting of the brake after the clutch is disengaged.

5. In steering mechanism for traction means of the endless traction type comprising a driving element geared to the traction belt and a driving shaft on which said driving element is loosely fitted, a driven clutch member and brake drum for rotating said driving element, a brake band cooperable with the brake drum, a driving clutch member splined to the driving shaft and cooperable with the driven clutch member, a shifter for the driving clutch member, an operating collar having lugs connected to the ends of the brake band, a control shaft on which the operating collar is fixed, a roller carried by the control shaft, said shifter having a cam-way receiving the roller and provided with an angular portion and a straight portion coacting with the roller to shift the driving clutch member and to permit of continued tightening of the brake band after the driving clutch member is disengaged from the driven clutch member.

In witness whereof, I hereto affix my signature.

ROBERT L. BROWN.